Dec. 4, 1951 W. R. PARKER 2,576,965
THIMBLE GUIDE VALVE
Filed July 18, 1949
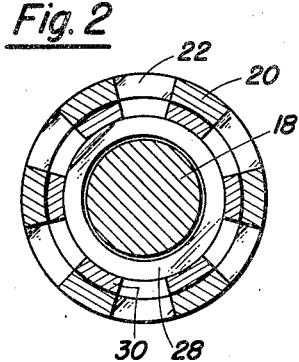
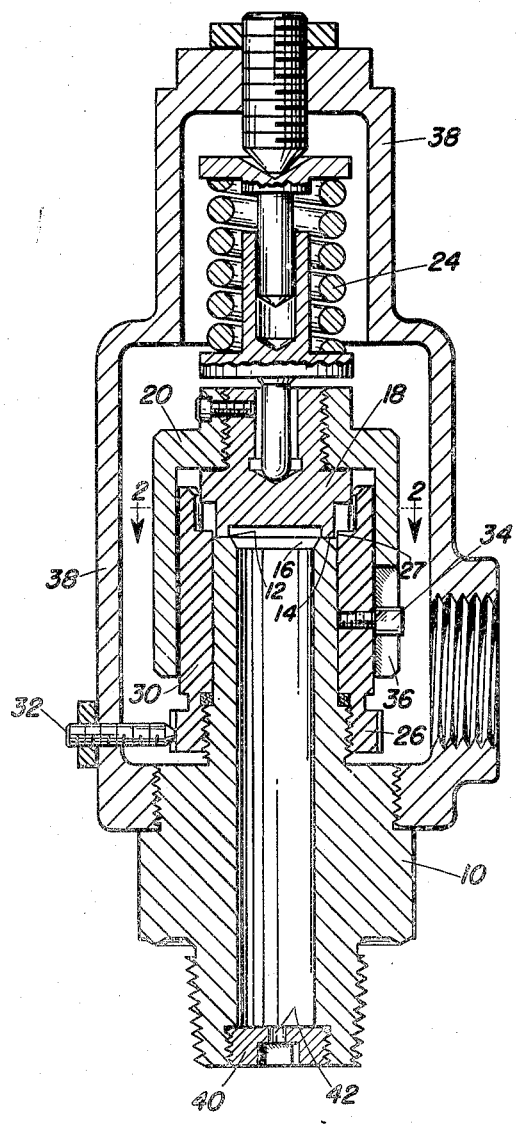
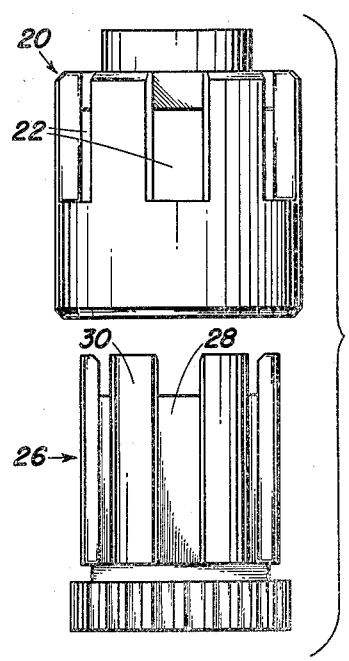
INVENTOR.
William R. Parker
BY
Attorney Patented Dec. 4, 1951

2,576,965

UNITED STATES PATENT OFFICE 2,576,965

THIMBLE GUIDE VALVE

William R. Parker, San Francisco, Calif.

Application July 18, 1949, Serial No. 105,437

11 Claims. (Cl. 137—53)

(Granted under the act of March 3, 1883, as amended April 30, 1928; 370 O. G. 757)

This invention relates to valves and more particularly to relief or sentinel valves.

In valves of the type presently used, the surfaces provided for guiding the disc to and from its seat are often entirely above or entirely below the seat, and also are spaced a considerable distance from the seat. This displacement results in a tendency of the valve to cock or wobble within the limits of guide clearance. Not only does this misalignment cause the valve to wear out rapidly, but it results in unsatisfactory performance during the life of the valve. In those valves wherein guiding surfaces lie on both sides of the valve seat, the operation of the valve has also been unsatisfactory, since the surfaces have usually been extended over a number of different parts, resulting in poor alignment due to uneven wear, uneven thermal expansion, and other like causes. Binding of the parts also sometimes resulted, probably from differences in thermal expansion.

Therefore, primary objects of the invention are to provide a valve wherein cocking or wobble of moving parts and the likelihood of binding of parts are reduced to minimums.

In prior art devices of the character described herein, it has been customary to sharpen the included angle of the seat to as little as 60° in order to make the disc self-centering. This adjustment results in rapid breakdown of the valve due to uneven side pressures from exhaust ports or loading springs, and also results in a pronounced tendency of the disc to stick in its seat after a reduction in the initial pressure in the line.

It is therefore a further object of the invention to provide a wobble-free valve wherein seat and disc mating surfaces can be substantially flat, if desired.

Prior art devices of the type under consideration have also necessarily been provided with large clearances between moving and non-moving parts, since the conventional arrangement of these parts has been such that heat-expandable moving parts have been positioned within air-cooled non-moving parts.

It is therefore another object of the invention to provide a relief valve wherein heat expandable moving parts will be positioned externally of non-moving parts, thus permitting much finer machining of all parts of the valve than has been possible heretofore.

Also, scoring of seat and disc surfaces, with resultant leakage therebetween, has characterized prior art devices wherein relative rotation between said surfaces is permitted. This scoring is apparently due to the presence of foreign matter deposited between these surfaces. It is therefore a further object of this invention to provide a valve wherein relative rotation between seat and disc surfaces is prevented, whereby a positive leak-proof seating of the disc in its seat is obtained.

It has also been characteristic of prior art devices that separate and distinct elements have been provided for performing separate and distinct functions. This has resulted in a multiplicity of parts, and it is a further object of the invention to provide means that perform many functions; thus, in the embodiment illustrated and described herein, the guiding surfaces are part of an adjustable blow down means, thus resulting in a more simple and fool-proof structure.

These objects, together with other objects which will appear hereinafter, such as the provision of simple and readily inter-changeable parts, and of means providing for accurate lapping of seat and disc surfaces, are achieved by the invention described and illustrated herein.

Briefly, the invention herein includes the features of guiding surfaces extended continuously above and below the valve seat, whereby wobble is reduced to a minimum and the use of flat discs and seats is made possible; of thimble-shaped valve stem means guided by said guiding surfaces and including exhaust ports; of moveable heat-expandable surfaces positioned externally of nonmoveable surfaces, whereby binding of moveable parts due to expansion is eliminated and close tolerance finishing is permitted; and of key means interconnecting the moveable and nonmoveable parts to prevent rotation of the valve disc in its seat.

In a presently preferred embodiment of the invention described and illustrated herein, the valve seat is formed at the upper end of a valve body, and the disc of the valve is carried in the dome of a thimble-like structure that is longitudinally slidable along the external, lateral surface of the upper end of the body whereby the disc can be successively brought into and out of mating engagement with the valve seat. The thimble is provided with circumferentially spaced exhaust ports for allowing passage of steam or other fluid to the atmosphere when the disc is unseated. The term "thimble," as used herein, shall be understood to include any generally thimble-shaped structure adapted to slidably embrace the guiding surfaces, to form one or more exhaust ports, and to carry the valve disc. It can include a lower annular portion, as illustrated herein, or can simply include spaced fingers for embracing the valve body and for defining exhaust ports therebetween.

For a better understanding of the invention, reference is made to the following specification of a presently preferred embodiment of the invention, said specification to be read in connection with accompanying drawing, wherein Fig. 1 is a longitudinal cross section of a valve embodying the invention;

Fig. 2 is a horizontal section taken along line 2—2 of Fig. 1; and

Fig. 3 is an exploded view in elevation of a feature of the invention.

Referring to the drawing, the device comprises a valve base 10 threaded at the lower end thereof for connection to a boiler or other source of pressure to be controlled, and having a valve seat 12 formed in the upper end thereof, said seat having an outer flat portion 14 and an inner bevelled portion 16, so that either flat or bevelled discs can be engaged. A disc 18, here illustrated as being flat, is provided for sealing engagement with the seat 12, said disc 18 being carried in the upper, dome-like portion of a thimble 20 having circumferentially spaced exhaust ports 22. The disc 18 and thimble 20 are biased to closed relationship with said seat 12 by means of a conventional spring and pin arrangement 24. An externally fluted blow down member 26, including an inner cylindrical portion 28 and an outer portion comprising circumferentially spaced ribs 30, is threadedly connected to the base 10 and forms a guide and bearing surface for the depending cylindrical portion of the thimble 20. Ribs 30 provide a close sliding fit within the thimble 20 and are so dimensioned that the spaces between them are preferably at least as large circumferentially as the exhaust ports 22 and will register with these ports when the thimble is properly oriented. Ribs 30 extend an appreciable distance above and below seat 12 and thereby provide guiding surfaces above and below said seat for preventing wobble and the consequent misalignment of the disc that is characteristic of prior art devices. It will be recognized that base 10 and blow down member 26 in combination provide, inter alia, a seat for the disc and a guiding surface for the thimble carrying the disc, and therefore functionally comprise a valve body. Set screw 32 is provided for fixing member 26 in place relative to base 10 after it has been longitudinally adjusted to provide the desired blow down ratio, said ratio being determined by the distance that the inner surface 27 of the cylindrical portion 28 of member 26 extends axially above flat portion 14 of the seat 12. Key 34, having a free sliding fit in key way 36 formed in thimble 20, is provided for preventing rotation of thimble 20, and therefore of disc 18, about the longitudinal axis of base 10, and for orienting the ribs 30 of blow down member 26 relative to the exhaust ports 22 of the thimble 20. The valve assembly is enclosed in a bonnet 38, of conventional design, that carries set screw 32. An insert 40 is removably positioned in the lower end of base 10. It will be recognized that the effective opening 42 of this insert determines the rate at which pressure is applied to the valve, and if this opening is sufficiently constricted, the valve will operate as a sentinel valve rather than as a relief valve. For use of the valve as a relief valve, insert 40 could be dispensed with, and only used to convert the relief valve to sentinel use.

Operation

In assembly, the blow down member 26 is first positioned on the base 10 to obtain the desired blow down ratio. It will be apparent that the resultant cylindrical surface 27 extending axially above the valve seat 12 will cause fluid escaping upon the unseating of disc 18 to undergo a 90° bend in its path and thereby be reduced in velocity to prevent wire drilling. A disc 18, either flat or bevelled, is then mounted in the thimble 20. Thimble 20 is then slid onto the blow down member 26, key 34 riding in keyway 36. The bonnet 38 is then fixed to base 10, set screw 32 adjusted to engage the lower, grooved portion of blow down member 26, and the spring and pin arrangement 24 adjusted to set the blow-off pressure point.

It will be seen that this device achieves the desired objects. Ribs 30 provide a guiding surface extending above and below seat 12, whereby wobble or cocking is eliminated. Disc 18 is carried by thimble 20 which is guided by ribs 30. Thimble 20, which is of relatively larger diameter and is subjected most directly to the heat of steam escaping from the system, and hence is subject to the greatest thermal expansion, is carried externally of the remaining parts of the system, thus reducing the possibility of binding. Key 34 in keyway 36 prevents rotation of disc 18 in seat 12, and thereby reduces possibility of wear. Ribs 30 not only provide a guiding surface for thimble 20, but also provide means whereby the diameter of blow down member 26 can be quickly and accurately increased to compensate for wear. This can be accomplished by swaging the ribs to increase the diameter of the guiding surface and then machining them to provide a perfect fit. This process avoids the need for replacing the part. It will also be seen that the blow down member comprises a convenient guide whereby the disc and seat may be accurately lapped.

It will be apparent that many modifications of this valve can be made within the spirit of the invention. For example, the valve body can be formed in many ways. Thus, the outer guiding surface of blow down member 26 can be substantially continuous instead of ribbed, provided, of course, that spaces or perforations are included (corresponding to the spaces between the portions of the ribs 30 in the preferred embodiment extending above the portion 28) to permit escape of fluid. Or, alternately, either in the device as illustrated or in the modification above mentioned, the base and blow down member can be formed integral. These two alternate embodiments of the invention do not, of course, provide an adjustable blow down means. Similarly the spacing and shape of the exhaust ports 22 is subject to wide variation, the only limitation being that the spaces between ribs should be so dimensioned and located that they can be positioned to register with the exhaust ports.

It will also be noted, in the embodiment illustrated herein, that rotation of the blow down member 26 will result in a corresponding rotation of the thimble 20 and therefore of disc 18 relative to seat 12. In the event that this displacement should be undesirable, key 34 can be mounted in bonnet 38 for engagement with keyway 36 in a manner similar to the mounting of set screw 32, instead of being mounted in the blow down member 26 as illustrated herein. In this event, in order to prevent blocking of exhaust ports 22 by the upper portion of ribs 30 due to rotation of blow down member 26 relative to thimble 20, the ports 22 could either be made wider circumferentially or the ported portion of thimble 20 could be circumferentially grooved on its inner surface to provide a circumferential channel lying radially outward of the exterior surface of ribs 22 providing a clear passage for the escape of fluid regardless of the orientation of the thimble relative to the body.

It is therefore submitted that the specific embodiment described and illustrated herein is but a presently preferred embodiment and that many modifications thereof are permissible within the scope of the invention. The full scope of the invention is pointed out in the following claims.

The invention described herein may be manufactured and used by or for the Government of the United States of America for governmental purposes without the payment of any royalties thereon or therefor.

What is claimed is:

1. A valve assembly comprising a hollow cylindrical valve body having one end open to receive fluid and its other end open to discharge fluid and having a generally annular valve seat formed internally and coaxially thereon intermediate the ends thereof, a thimble of generally cylindrical form disposed over said body in sliding relation thereto and having a disc adapted for engagement with said seat, portions of said thimble being in guiding contact with said body on both sides axially of the seat region while said thimble travels between full open and closed valve positions whereby said disc is effectively guided against undesired cocking off the correct line of travel, and cooperating means on said body and said thimble to prevent substantially any rotation of said thimble relative to said body while permitting relative sliding motion.

2. A valve assembly of the character described comprising a valve body having a discharge opening surrounded by an annular valve seat and having a generally cylindrical external guide surface coaxial with said seat and extending on both sides axially of the seat region; and a thimble provided interiorly at its closed end with a disc adapted for engagement with said seat, said thimble being disposed on said body with its internal cylindrical surface in guided axial sliding relation with said external guide surface and of sufficient axial length to remain in guiding contact therewith on both sides axially of said seat region during movement of said disc between closed and full open valve positions.

3. The device of claim 2 wherein the thimble is perforated to permit relatively free flow of fluid between said discharge opening and the region exterior to said thimble.

4. A valve assembly comprising a hollow cylindrical valve body having one end open to receive fluid and its other end open to discharge fluid and having an annular valve seat formed internally and coaxially thereon intermediate the ends thereof, and a thimble of generally cylindrical form disposed over said body in sliding relation thereto and having a disc adapted for engagement with said seat, portions of said thimble being in guiding contact with said body on both sides axially of the seat region while said thimble travels between full open and closed valve positions whereby said disc is effectively guided against undesired cocking off the correct line of travel, the external surface of the body which guides the thimble including a plurality of ribs whereby wear of the guide surface can be compensated by swaging said ribs to increase the effective diameter of the guiding surface.

5. A valve assembly comprising a hollow cylindrical valve body having one end open to receive fluid and its other end open to discharge fluid and having an annular valve seat formed internally and coaxially thereon intermediate the ends thereof, a thimble of generally cylindrical form disposed over said body in sliding relation thereto and having a disc adapted for engagement with said seat, portions of said thimble being in guiding contact with said body on both sides axially of the seat region while said thimble travels between full open and closed valve positions whereby said disc is effectively guided against undesired cocking off the correct line of travel, and means detachably connected to the fluid-receiving end of said body for reducing the entry of said body to a constricted orifice whereby said device can be converted into a sentinel valve.

6. A valve comprising a valve body, a valve seat formed therein, a disc, cooperating means extending on either side of said seat for guiding said disc to said seat, said means including a perforated thimble carrying said disc and guide surfaces formed on the external, lateral faces of said valve body for guiding the movement of said thimble, and means for preventing substantially any relative rotation between said valve body and said thimble.

7. The device according to claim 6, wherein said valve body includes a valve base and an externally ribbed blow down member connected thereto and longitudinally adjustable therealong.

8. A valve assembly of the character described comprising a valve body having a discharge opening surrounded by an annular valve seat and having a generally cylindrical external guide surface coaxial with said seat and extending on both sides axially of the seat region; and a thimble provided with a disc adapted for engagement with said seat, said thimble being disposed on said body in axial sliding relation thereto and being guided during its motion between closed and full open valve positions substantially entirely by the contact of its internal cylindrical surface against said external cylindrical guide surface of said body.

9. The device according to claim 8 wherein cooperating means are provided on the body and thimble to prevent substantially any rotation of the thimble relative to the body while permitting relative sliding motion.

10. The device of claim 8 wherein the thimble is perforated to permit relatively free flow of fluid between said discharge opening and the region exterior to said thimble.

11. A valve assembly comprising a valve body member having an annular valve seat; a disc member including a disc adapted for engagement with said seat; and means, including an element carried by said disc member, for preventing substantially any relative rotation between said disc and said seat.

WILLIAM R. PARKER.

REFERENCES CITED

The following references are of record in the file of this patent:

UNITED STATES PATENTS

| Number | Name | Date |
| --- | --- | --- |
| 283,146 | Richardson | Aug. 14, 1883 |
| 328,840 | De Witt | Oct. 20, 1885 |
| 525,963 | McNeil | Sept. 11, 1894 |
| 2,414,794 | Bergquist | Jan. 28, 1947 |

FOREIGN PATENTS

| Number | Country | Date |
| --- | --- | --- |
| 104,668 | Sweden | of 1942 |